United States Patent
Breuer

(10) Patent No.: US 7,149,760 B1
(45) Date of Patent: Dec. 12, 2006

(54) METHOD FOR HANDLING OF DIFFERENT VERSIONS OF A DOCUMENT IN A COMPUTER SYSTEM

(75) Inventor: Matthias Breuer, Seevetal (DE)

(73) Assignee: Sun Microsystems, Inc., Santa Clara, CA (US)

( * ) Notice: Subject to any disclaimer, the term of this patent is extended or adjusted under 35 U.S.C. 154(b) by 774 days.

(21) Appl. No.: 09/693,327

(22) Filed: Oct. 20, 2000

(30) Foreign Application Priority Data

Oct. 20, 1999 (EP) .................................. 99120087

(51) Int. Cl.
*G06F 17/00* (2006.01)
*G06F 17/30* (2006.01)

(52) U.S. Cl. ...................................... 707/203; 715/511

(58) Field of Classification Search ................ 707/1–3, 707/8, 202–204; 715/511, 500.1
See application file for complete search history.

(56) References Cited

U.S. PATENT DOCUMENTS

| | | | |
|---|---|---|---|
| 5,535,386 A | 7/1996 | Wang | |
| 5,604,862 A | 2/1997 | Midgely | |
| 5,819,295 A | 10/1998 | Nakagawa | |
| 5,890,176 A | 3/1999 | Kish | |
| 6,216,212 B1* | 4/2001 | Challenger et al. | 711/163 |
| 6,249,795 B1* | 6/2001 | Douglis | 715/511 |
| 6,560,620 B1* | 5/2003 | Ching | 715/511 |
| 6,738,799 B1* | 5/2004 | Dickenson | 709/203 |
| 6,918,082 B1* | 7/2005 | Gross et al. | 715/511 |
| 2002/0073106 A1* | 6/2002 | Parker et al. | 707/200 |
| 2004/0205340 A1* | 10/2004 | Shimbo et al. | 713/165 |

FOREIGN PATENT DOCUMENTS

| | | |
|---|---|---|
| FR | 2 580 095 A | 1/1984 |
| WO | WO 93 12498 A | 6/1993 |

\* cited by examiner

*Primary Examiner*—Alford W. Kindred
(74) *Attorney, Agent, or Firm*—Gunnison, McKay & Hodgson, L.L.P.; Forrest Gunnison

(57) ABSTRACT

A method for handling different versions of a document in a computer system comprising a storage medium includes storing each of the different versions in its entirety in a file on the storage medium.

15 Claims, 4 Drawing Sheets

METHOD FOR HANDLING OF DIFFERENT VERSIONS OF A DOCUMENT IN A COMPUTER SYSTEM

BACKGROUND OF THE INVENTION

1. Field of the Invention

The present invention-relates generally to storing different versions of information and in particular to a method of handling different versions of a document in a computer system.

2. Description of Related Art

In a computer system, different versions of a document, one current version and one or more earlier versions, may have to be handled, for example for purposes of documenting the historical development of the document. Documents are understood to be data files suitable for being stored and processed on computer systems in general, including text documents, spreadsheets, tables, pictures or any other set of data representing information.

Computer programs for handling, i.e. storing and retrieving, that means opening or displaying, different versions of a document already exist in the prior art as illustrated in FIG. 1. Version seven 107 was the newest or current version of the document and version one was the earliest version.

The area of a storage medium in which the relevant information concerning the document was stored was a storage unit that could be divided into storage sub-units. The entire current version 107 of the document was stored in a storage sub-unit 100 assigned to the document.

The earlier versions of the document were not stored in their entirety in storage sub-unit 100. Instead, each earlier version of the document was compared with the next newer version of the document and only the differences between the two versions were stored together with information about the respective position of each of the differences. Stated another way, only the differences between each version and its immediate predecessor version were stored along with the information necessary to restore the earlier versions using only the differences.

Therefore, storage sub-unit 100 also included the differences between the first and the second version 101, between the second and the third version 102, between the third and the fourth version 103, between the fifth and fourth version 104, between the sixth and the fifth version 105 and between the seventh and the sixth version 106. If the first version of the document had to be displayed, the current seventh version 107 was opened and any differences 106 between the seventh and the sixth version, any differences 105 between the sixth and the fifth version, any differences 104 between the fifth and the fourth version, any differences 103 between the fourth and the third version, any differences 102 between the third and the second version, and any differences 101 between the second and the first version were inserted in the current seventh version to generate the first version. With this storage method, the first version was restored or reconstructed successively from the current seventh version and the differences of all of the other earlier versions relative to each other.

This solution was laborious and time consuming, since several steps had to be carried out. Furthermore, if the current version or any differences between versions were not properly retrievable, the desired first version could not be restored. In the case where a large number of versions of a document were stored, this dependency was a serious risk factor.

In a document, which comprises, for example, tables the differences between the various earlier versions of this document may, for example, reside only in the fourth row in the fifth table of the document. In this example, the content of the earlier versions' fourth row of the fifth table was stored, together with the information that this piece of data belonged to the fourth row of the fifth table, not to any other row or column of any other table, and with the information that it belonged to a certain earlier version, not any other earlier version. The rest of the earlier versions were not physically stored.

This process of storing and retrieving earlier versions of a document was time consuming, since several processing steps had to be performed to restore the desired earlier version. In addition, if problems occurred in storing or retrieving the current version of the document, the same problems applied to the retrieval of any earlier version, since the retrieval of any earlier version depended on the current version's successful retrieval.

In another prior art method, as disclosed in U.S. Pat. No. 5,819,295, versions of a document were each stored as separate files and various files were collected in folders. The method of the '295 patent required an elaborate management system to determine in which folder each version of a document was stored. While this eliminated the problems noted above, the overhead with such a complex management scheme makes it impractical for use with a word processing or spreadsheet application, for example.

SUMMARY OF THE INVENTION

A method for improved storage and retrieval of earlier versions of a document provides for faster and more secure retrieval of earlier document versions. In one embodiment, the method for handling different versions of a document, where the different versions include one current version and at least one earlier version, stores the at least one earlier version of the document in its entirety in a file on a storage medium of the computer system. The method of this invention, also stores the current version of the document in its entirety in the same file.

In one embodiment, the current version comprises historic information concerning the current version and each of the different versions comprises historic information concerning that version. Storing the current version includes storing the historic information of the current version with the current version. Similarly, storing the at least one earlier version includes storing the historic information of the at least one earlier version with the at least one earlier version. The historic information about a document version may contain at least its saving date. It is possible that this historic information contains also other information, which allows the user to identify or characterize the respective version, like names of individuals who have worked on this version.

The method for handling different versions of a document also may include displaying, on demand of a user of the computer system, a listing showing at least the historic information about the different document versions, and loading any of the different versions for further processing in response to a user's choice from the listing. This allows the user to select quickly the version that the user would like to have output to any output or storage device, like a screen, a printer or another storage medium coupled to the user's computer system.

In another embodiment of the inventive method, the earlier versions of a document are saved in a compressed form. This reduces significantly the required storage space.

Suitable compression programs reduce the required storage space by a factor of between two and four. Herein, a solution may be implemented which allows, possibly in response to a user's choice, that only predetermined parts of the documents, for example pictures, are compressed.

The method according to the present invention further may comprise identifying and displaying amendments in the different versions of a document on demand of a user together with the date of the amendments. This identifying and displaying amendments may also comprise the identification and display of the author of the amendments. In addition, the method may allow the display of any further information associated with the amendments like comments regarding the amendments or the date of first saving.

BRIEF DESCRIPTION OF THE DRAWINGS

In the Figures and the following detailed description, elements with the same reference numeral are the same element.

DETAILED DESCRIPTION

Figure 1:
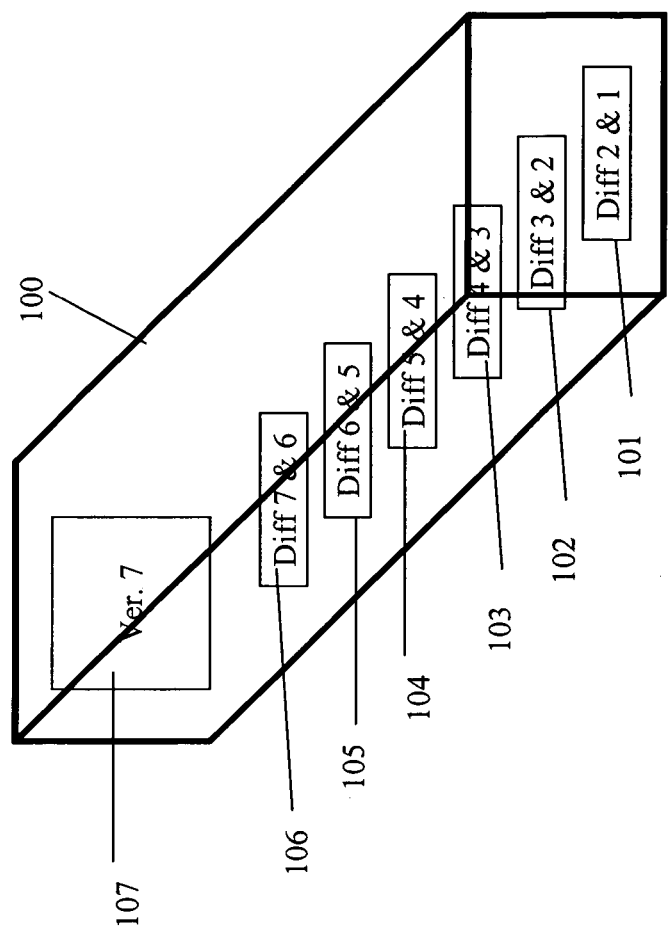
FIG. 1 is a diagram representing the storing of different document versions according to a prior art solution.

Method 230 of this invention stores multiple versions 220, 221 of a document within a single file 225 in a memory 211 of a computer system 200, i.e., in a computer storage medium. Unlike the prior art methods, each of version 220, 221 is stored in file 225 in its entirety. Consequently, when a user issues an instruction to retrieve a particular earlier version 220 of the document, method 230 simply goes to the same file, e.g., file 225, which includes current version 221 and retrieves earlier version 220.

The retrieval of version 220 is independent of the status of version of 221. In particular, if current version 221 can no longer be retrieved, e.g., current version 221 inadvertently was erased or became corrupted during a computer system crash, version 220 can be successfully opened and used in contrast to the method of FIG. 1, which required the current version to generate all earlier versions.

As used herein, documents include, but are not limited to, text documents, spreadsheets, tables, pictures or any other set of data representing information. A computer system, which is able to carry out inventive method 230, comprises, in one embodiment, a processor, a storage medium, an input device and an output device. The storage medium can be a hard disc, a floppy disc, a tape, flash memory, static random access memory, random access memory, a CD-ROM or anything comparable within the computer system, or accessible by the computer system over a network. This storage medium can belong to the computer system itself as illustrated in FIG. 2, but the storage medium also can belong to another computer system, e.g., memory 284, and can be connected via a data line or a network to computer system 200.

Figure 2:
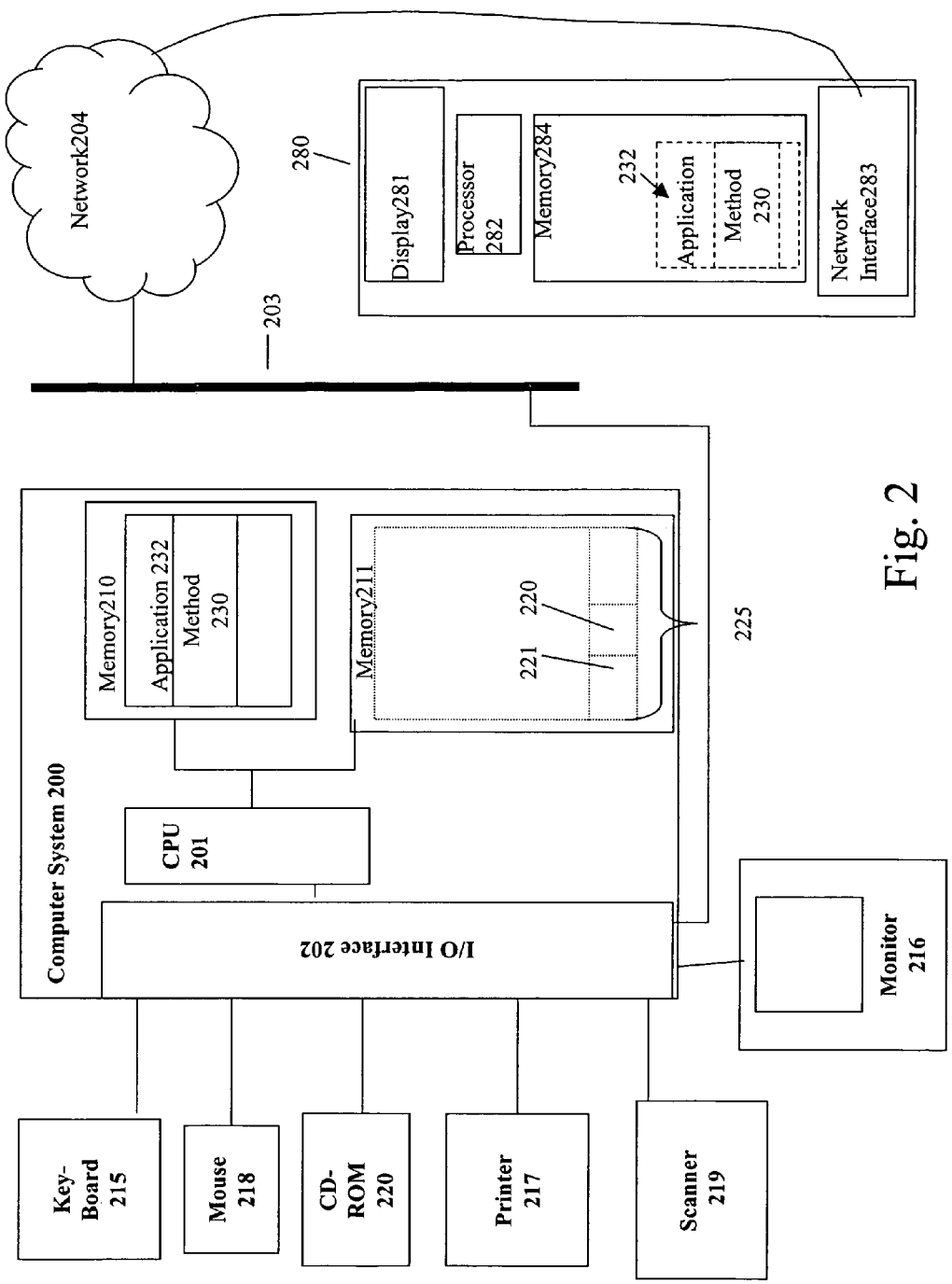
FIG. 2 is a high level diagram representing an example for a computer system being usable in the scope of the present invention.

In the embodiment of FIG. 2, the memory of computer system 200 is divided into a volatile memory 210, like a working memory, and a non-volatile memory 211, like a hard disc. In addition, computer system 200 may include a keyboard 215, a monitor 216, a printer 217, a mouse 218, a scanner 219 and CD-ROM 220 that all are connected to I/O interface 202. Frequently, computer system 200 also is connected to a network 203 via I/O interface 202. Optionally, network 203 can be connected to, or part of a larger network 204, for example, the Internet or a wide area network.

Figure 3:
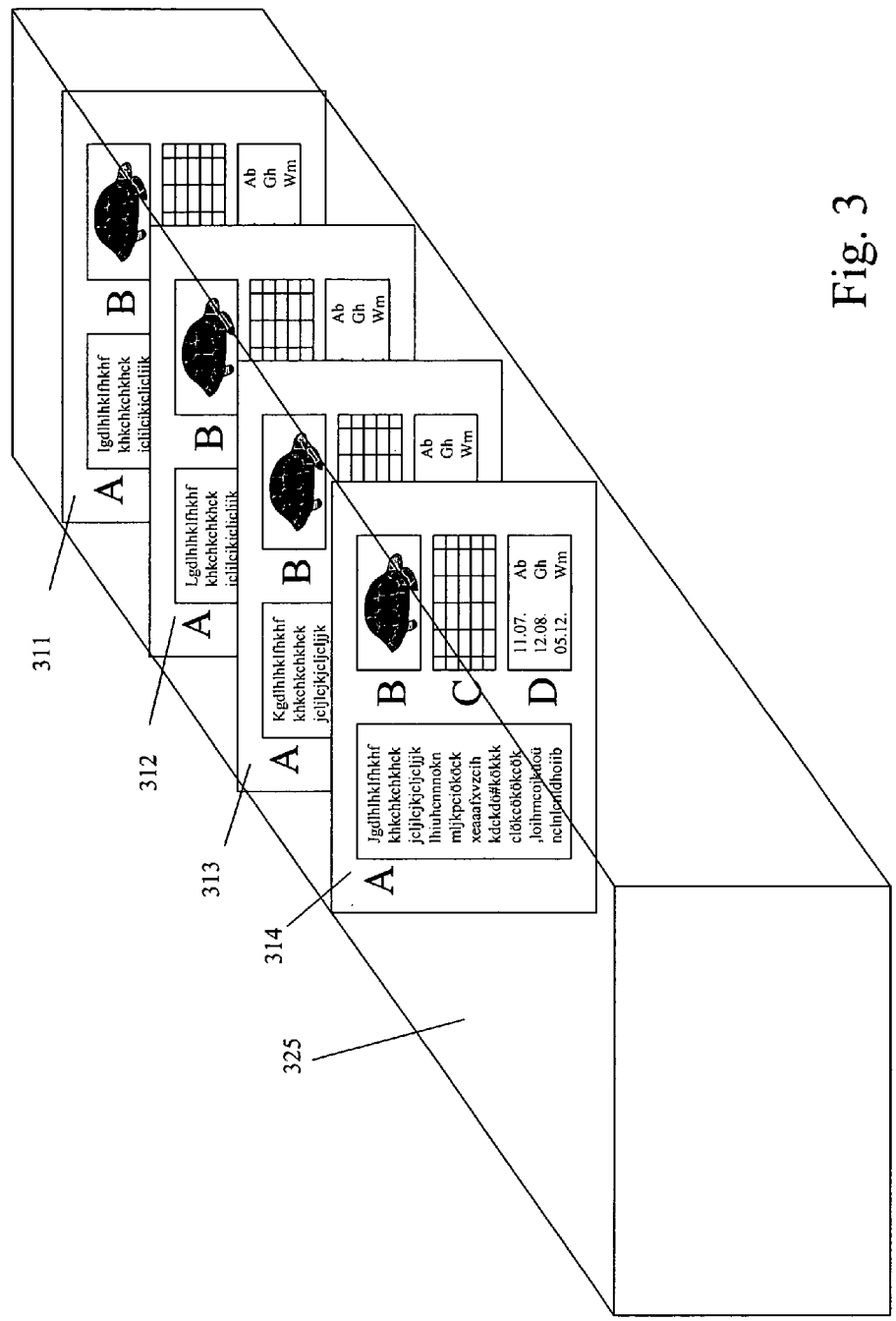
FIG. 3 is a diagram representing the storing of different versions of a document that includes different types of content in a file on a storage medium of a computer system according to the present invention.

FIG. 3 is a more detailed diagram of a file 325 in storage medium 211 of computer system 200 that stores first version 311, second version 312, third version 313 and fourth version 314 of a document. This document includes text, tables and pictures.

Each version 311 to 314 is stored in its entirety in file 325 and with each version is stored historic information and format information concerning that particular version of the document. The different information that makes up each version is stored within file 325 in a certain sequence and in a degree of separation, which allows quick distinction between the various types of content.

In this example, the text and the format of the text are one type of content and are stored together at position or address area A within each of versions 311 to 314. The pictures belong to another type of content and are stored in address area B within each of versions 311 to 314. The tables of the document belong to yet another type of content and are stored in address area C within each of versions 311 to 314. Finally, the historic information regarding the document version is stored in address area D within each of versions 311 to 314. The historic information may include, for example, data about the user who created this document version, its saving date, its printing date or any other relevant information about the particular document version.

Each time a user of computer system 200 issues a save document instruction to an application 232 that is executing on CPU 201, application 232 saves the document. The first time that the user issues a save document instruction, the document is saved as an initial version in a new file on the storage medium. Subsequently, if the user opens, edits— amends or changes—, and then saves a version of the document, another entire version of this document is created and automatically saved in the file.

In another embodiment of the present invention, each earlier version of the document is compressed, using any one of the commonly available data compression programs, and then stored. In this embodiment, as soon as a newer version is created, the previous version is compressed and stored in the file. This reduces the required storage space substantially. Common compression applications typically compress the data up to a quarter of its original size.

Figure 4:
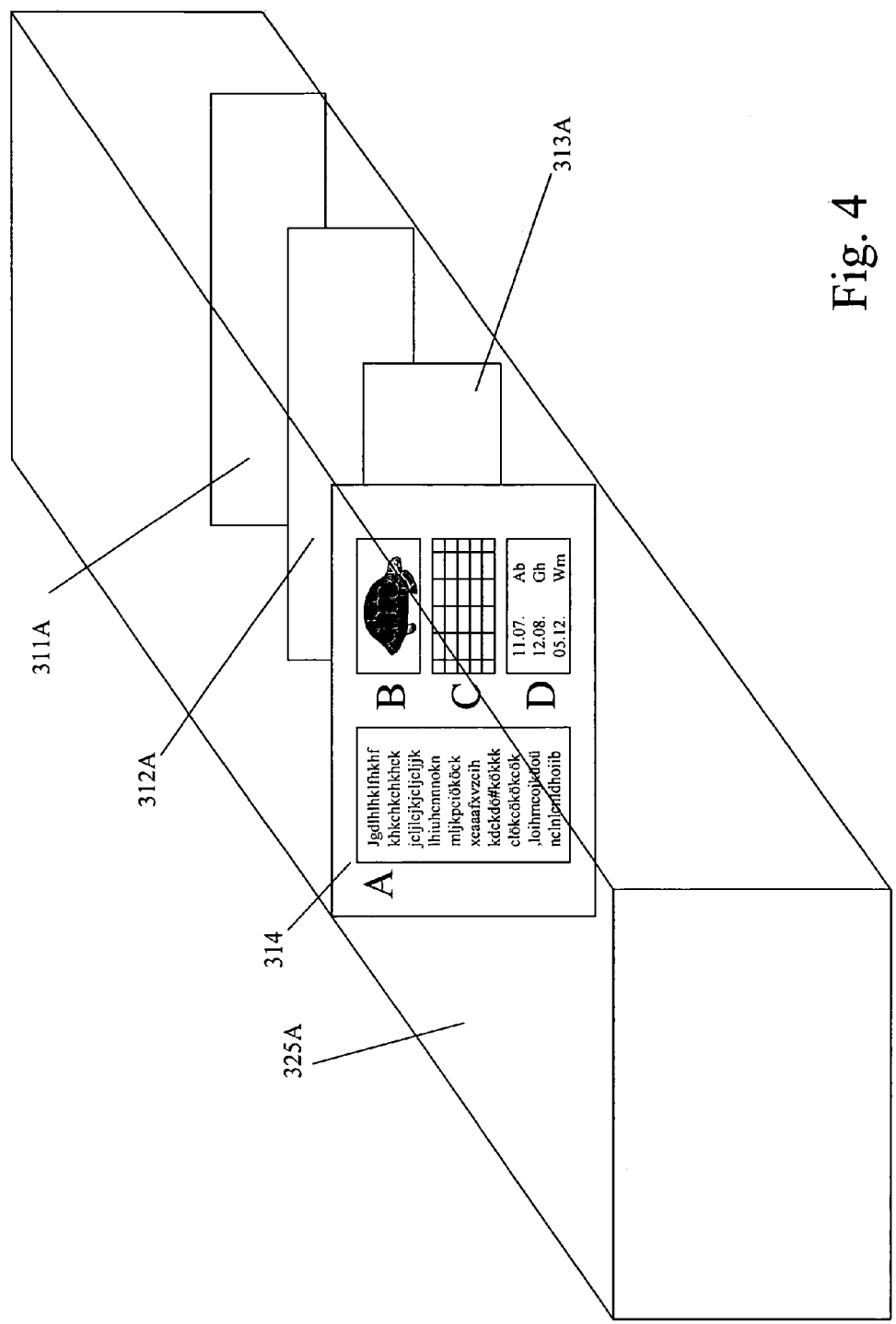
FIG. 4 is a diagram representing the compression of different document versions according to the present invention according to FIG. 3.

File 325 of FIG. 3 is illustrated with compression as file 325A in FIG. 4. Version one 311, version two 312, and version three 313 of FIG. 3 have been compressed and stored as compressed version one 311A, compressed version two 312A, and compressed version three 313A, i.e., the earlier versions are stored in a compressed form.

If the user wants to retrieve compressed version one 311A of the document, there is only one operation to carry out. The content of compressed version one 311A has to be decompressed. This provides not only fast, but also secure access to different document versions. With the compression and decompression of the various document versions, storage space consumption is limited.

In another embodiment of the present invention, when a user who opens a document, the user can access, for example, a listing of which users worked on this document. This listing may be implemented in the form of a drop-down list, that means a list which is created on demand of the user, for example in response to a mouse-click, by displaying the listing below the generic information about the document. In yet another embodiment, the content of the listing may be chosen by the user from among the historic information stored with each version of the document by selecting an appropriate entry in a menu.

Similarly, a user can open a document and then select a listing of the versions of the document stored in the file. The selection of the version listing results in display of a drop-down list of the versions. The user can retrieve a particular version of the document simply by selecting the desired version in the list using an input device, e.g., a mouse. The retrieved version is loaded in the computer system for further use by the user.

If an old version is loaded by the user, the old version is opened in a read-only state. In one embodiment, if the user wants to edit the old version, the user must use a save-as instruction. In another embodiment, edits on a particular old version can be saved as sub-versions of that old version, e.g., version 2.1 of version 2. The important aspect is the independence of the various versions within a common file, which means that any stored version or sub-version of the document can be retrieved independent of the status or state of any other version of the document.

In comparison to the storage method of FIG. 1, the user quickly recognizes when opening any earlier versions of the document that retrieval of the document is carried out much faster. Another advantage of this method is that retrieving any one version of a document does not depend on the storage integrity of any other version of the document. For example if problems occurred during storing of any earlier version, the invention allows the user to retrieve the newer versions completely in full quality—provided that the newer versions themselves were stored properly—, whereas the prior art solution of FIG. 1 would not be able to restore any other newer versions.

Therefore, the present invention provides an advantageous solution to the problem of handling documents existing in different versions. The advantages of the invention are in particular faster and more secure document version retrieval.

Herein, a computer program product comprises a medium configured to store or transport computer readable code for method 230 or in which computer readable code for method 230 is stored. Some examples of computer program products are CD-ROM discs, ROM cards, floppy discs, magnetic tapes, computer hard drives, servers on a network and signals transmitted over a network representing computer readable program code.

As illustrated in FIG. 2, this storage medium may belong to computer system 200 itself. However, the storage medium also may be removed from computer system 200. For example, method 230 may be stored in memory 284 that is physically located in a location different from processor 201. The only requirement is that processor 201 is coupled to the memory. This could be accomplished in a client-server system, e.g. system 200 is the client and system 280 is the server, or alternatively via a connection to another computer via modems and analog lines, or digital interfaces and a digital carrier line.

Alternatively, memory 284 could be in a World Wide Web portal, while display unit 216 and an input device are in a client computer. In this case, the memory and processor used in executing method 230 are part of a server computer on a wide area network, a local area network, or the Internet, and the client computer is used only for input and output.

More specifically, computer system 200, in one embodiment, can be a portable computer, a workstation, a two-way pager, a cellular telephone, a digital wireless telephone, a personal digital assistant, a server computer, an Internet appliance, or any other device that includes the components shown and that can execute method 230. Similarly, in another embodiment, computer system 200 can be comprised of multiple different computers, wireless devices, cellular telephones, digital telephones, two-way pagers, or personal digital assistants, server computers, or any desired combination of these devices that are interconnected to perform, method 230 as described herein.

Accordingly, a computer memory refers to a volatile memory, a non-volatile memory, or a combination of the two in any one of these devices. Similarly, a computer input unit and a display unit refers to the features providing the required functionality to input the information described herein, and to display the information described herein, respectively, in any one of the aforementioned or equivalent devices.

In view of this disclosure, method 230 can be implemented in a wide variety of computer system configurations. In addition, method 230 could be stored as different modules in memories of different devices. For example, method 230 could initially be stored in a server computer 280, and then as necessary, a module of method 230 could be transferred to a client device 200 and executed on client device 200. Consequently, part of method 230 would be executed on the server processor 282, and another part of method 230 would be executed on processor 201 of client device 200. In view of this disclosure, those of skill in the art can implement the invention of a wide-variety of physical hardware configurations using an operating system and computer programming language of interest to the user.

In yet another embodiment, method 230 is stored in memory 284 of system 280 for downloading to memory 211 of system 200. Stored method 230 is transferred, over network 204 to memory 211 in system 200. In this embodiment, network interface 283 and I/O interface 202 would include analog modems, digital modems, or a network interface card. If modems are used, network 204 includes a communications network, and method 230 is downloaded via the communications network.

Method 230 of the present invention may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disc or a compact disc (CD), as well as on any common computer system's storage facilities like hard discs. Therefore, the present invention also relates to a data carrier for storing a computer program for carrying out the inventive method. The present invention also relates to a method for using a computer system for carrying out the presented inventive method. The present invention further relates to a computer system with a storage medium on which a computer program for carrying out the presented inventive method is stored.

I claim:

1. A method for handling different versions of a document in a computer system comprising a storage medium, wherein said different versions include one current version and at least one earlier version, said method comprising:
    storing said at least one earlier version of said document in its entirety in a file on said storage medium; and
    storing said current version of said document in its entirety in said file wherein said at least one earlier version and said current version are both in said file for subsequent use and further wherein retrieval of said at least one earlier version for said subsequent use is independent of a status of said current version.

2. A method according to claim 1,
wherein said current version comprises historic information and each of said different versions comprise historic information;
said storing said current version includes storing said historic information of said current version with said current version; and
said storing said at least one earlier version includes storing said historic information of said at least one earlier version with said at least one earlier version.

3. A method according to claim 2, comprising displaying on demand of a user of said computer system a listing showing at least a portion of said historic information about said different versions of said document, and loading one of said different versions of said document for further processing in response to said user's choice from said listing of said one of said different versions.

4. A method according to claim 1 wherein said method is stored in a first memory of a first computer system for downloading to a second memory of a second computer system.

5. A method for handling different versions of a document in a computer system comprising a storage medium, wherein said different versions include one current version and at least one earlier version, said method comprising:
storing said at least one earlier version of said document in its entirety in a compressed form in a file on said storage medium;
storing said current version of said document in its entirety in said file wherein said at least one earlier version and said current version are both in said file for subsequent use and further wherein retrieval of said at least one earlier version for said subsequent use is independent of a status of said current version.

6. A computer storage medium comprising:
at least one earlier version of a document stored in its entirety in a file on said computer storage medium; and
a current version of said document stored in its entirety in said file wherein said at least one earlier version and said current version are both in said file for subsequent use and further wherein retrieval of said at least one earlier version for said subsequent use is independent of a status of said current version.

7. A computer storage medium as in claim 6 wherein said current version comprises historic information for said current version and said at least one earlier version comprises historic information for said at least one earlier version, and said computer storage medium further comprises:
said historic information of said current version stored with said current version; and
said historic information of said at least one earlier version stored with said at least one earlier version.

8. A computer storage medium as in claim 6 wherein said at least one earlier version of a document is stored in its entirety in said file in a compressed form.

9. A computer program product comprising a computer readable medium including computer readable instructions for a method for handling different versions of a document in a computer system comprising a storage medium, wherein said different versions include one current version and at least one earlier version stored thereon, said method comprising:
storing said at least one earlier version of said document in its entirety in a file on said storage medium; and
storing said current version of said document in its entirety in said file wherein said at least one earlier version and said current version are both in said file for subsequent use and further wherein retrieval of said at least one earlier version for said subsequent use is independent of a status of said current version.

10. The computer program product of claim 9 wherein said current version comprises historic information and each of said different versions comprise historic information;
said storing said current version includes storing said historic information of said current version with said current version; and
said storing said at least one earlier versions includes storing said historic information of said at least one earlier version with said at least one earlier version.

11. The computer program product of claim 10 wherein said method further comprises displaying on demand of a user of said computer system a listing showing at least a portion of said historic information about said different versions of said document, and loading one of said different versions of said document for further processing in response to said user's choice from said listing of said one of said different versions.

12. A system comprising:
a processor; and
a storage medium;
a memory coupled to said processor and to said storage medium, and memory having stored therein computer instructions for a method for handling different versions of a document in said system, wherein said different versions include one current version and at least one earlier version, said method comprising:
storing said at least one earlier version of said document in its entirety in a file on said storage medium; and
storing said current version of said document in its entirety in said file wherein said at least one earlier version and said current version are both in said file for subsequent use and further wherein retrieval of said at least one earlier version for said subsequent use is independent of a status of said current version.

13. The system to claim 12,
wherein said current version comprises historic information and each of said different versions comprise historic information;
said storing said current version includes storing said historic information of said current version with said current version; and
said storing said at least one earlier version includes storing said historic information of said at least one earlier version with said at least one earlier version.

14. The system according to claim 13 wherein said method further comprises displaying on demand of a user of said system a listing showing at least a portion of said historic information about said different versions of said document, and loading one of said different versions of said document for further processing in response to said user's choice from said listing of said one of said different versions.

15. The system of claim 12 wherein said storing said at least one earlier version of said document in its entirety in said file on said storage medium further comprises:
storing said at least one earlier version of said document in its entirety in a compressed form in said file.

* * * * *